Dec. 24, 1929.  E. A. HELLSTRAND  1,740,734

SHOCK ABSORBER FOR USE IN VEHICLE SUSPENSION

Filed March 3, 1928  2 Sheets-Sheet 1

Edward Axelsen Hellstrand
Inventor
by [signature]
His Attorney

Dec. 24, 1929.   E. A. HELLSTRAND   1,740,734
SHOCK ABSORBER FOR USE IN VEHICLE SUSPENSION
Filed March 3, 1928   2 Sheets-Sheet 2

Edward Axelson Hellstrand
Inventor
by Edw. Pauling
His Attorney

Patented Dec. 24, 1929

1,740,734

UNITED STATES PATENT OFFICE

EDWARD AXELSON HELLSTRAND, OF GUILDFORD, ENGLAND

SHOCK ABSORBER FOR USE IN VEHICLE SUSPENSION

Application filed March 3, 1928, Serial No. 258,796, and in Great Britain March 1, 1927.

This invention relates to shock absorbers or motion dampers for use in vehicle suspension, and its principal object is to provide a simple and effective appliance, whilst a further object is to combine with it a torque-resisting device, each having particular advantages relative to adjustments to suit load and running conditions.

The invention broadly consists in mounting a wheel axle to slide in horn plates or equivalent guides, whose frictional effect is controllable independently or automatically, and preferably means are provided whereby the frictional effect of the axle guides increases with the displacement of the axle from a normal position.

Figure 1:
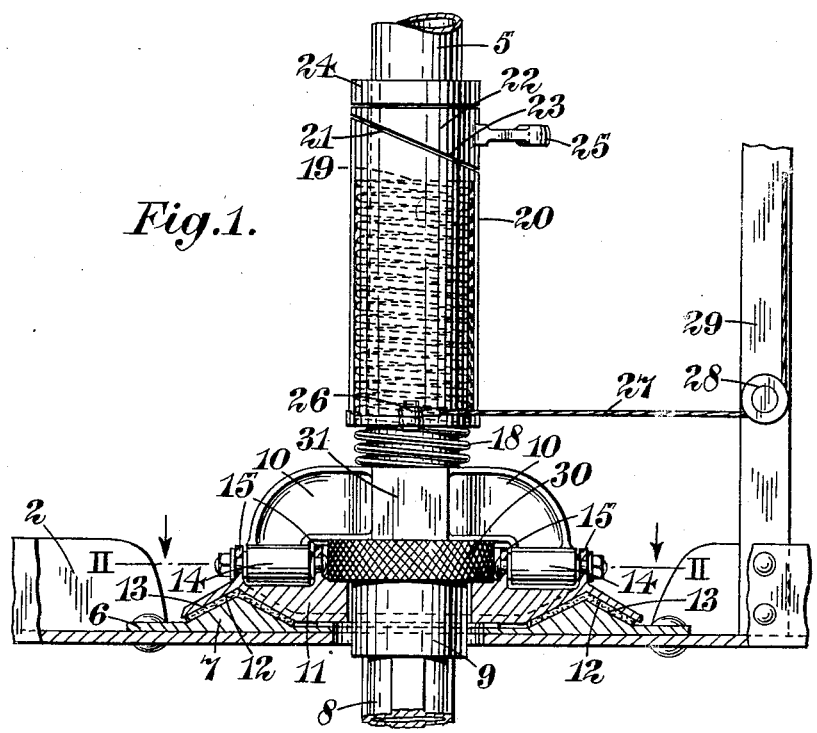
Figure 2:
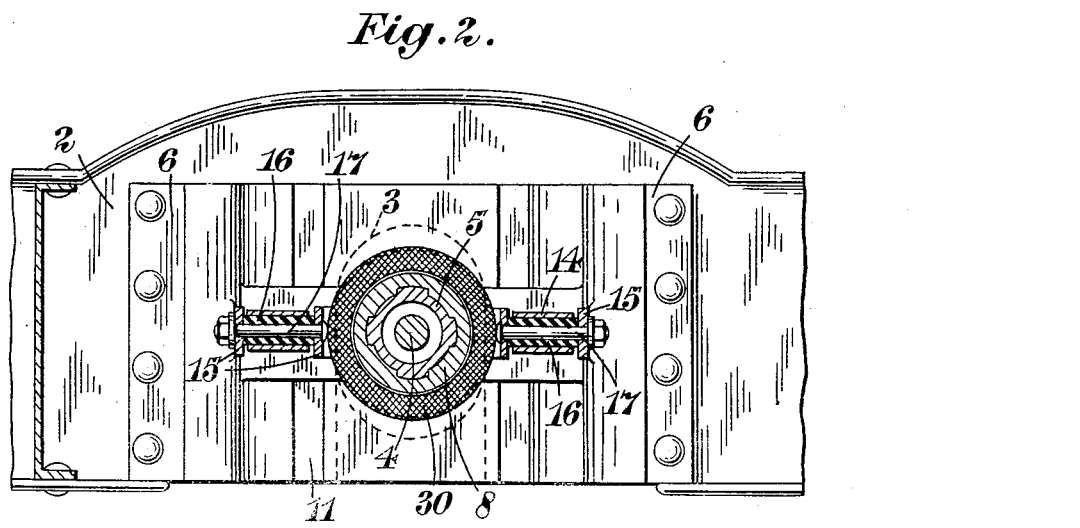
Figure 3:
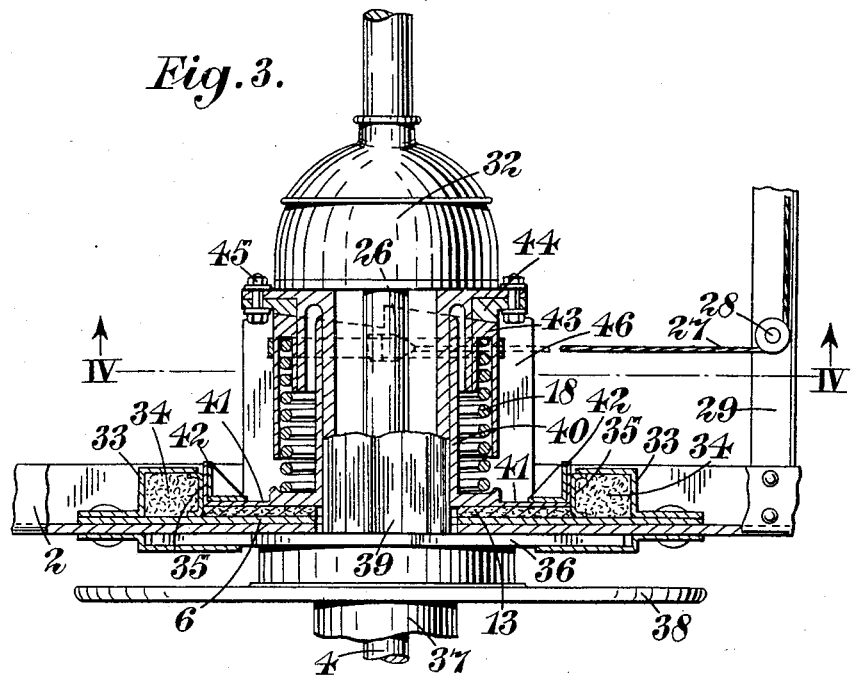
Figure 4:
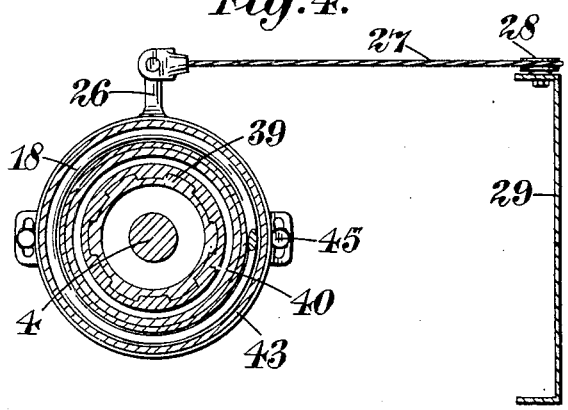

In the accompanying drawings, which illustrate the manner of carrying out the invention, Figure 1 is a fragmentary plan showing part of a side frame member of the vehicle with the axle and friction device in position, Figure 2 is a sectional side elevation on the line II—II of Figure 1, Figure 3 is a similar view to Figure 1 but shows a modified construction, and Figure 4 is a sectional view on the line IV—IV of Figure 3 as seen in the direction of the arrow.

In one method of carrying out the invention, more particularly intended for the rear driving axle of a motor vehicle, each side frame member 2 of the vehicle is provided with a vertical slot 3 to receive the axle 4 in its casing 5 and to allow for its permissible vertical movement as well as for a certain amount of lateral movement. At the sides of these slots and on the inner faces of the frame members 2 are provided in effect horn plates constituted by securing to the side frame a plate or plates 6 having vertical ridges 7, one on each side of the slot, which may be of V-section or rectangular, the apex angle of the V being preferably in the region of 120 degrees.

The axle or the axle casing, as the case may be (in this example, the casing 5), is externally splined at 8 and has slidably mounted upon it a splined sleeve 9 having radial extensions 10 on opposite sides, forming thereby a yoke. These radial extensions are connected to a plate 11 which is shaped to form grooves 12 which fit the ridges 7 on the horn plates 6, and friction material 13 is provided between the contacting surfaces. The extensions 10 have bearing bosses 14 which engage between jaws 15 in the plate, and in the bosses are blocks or bushes 16 (Figure 2) of rubber or equivalent resiliently yielding material through which extend the fixing bolts 17.

It will be evident, therefore, that this arrangement provides for a limited amount of twist of the axle, and for its vertical or tilting movements as well as for a slight displacement in a direction longitudinal of the vehicle, the plate 11 yoked to the sleeve 9 sliding on the ridge members 7 on the horn plates.

The sliding plate 11 is maintained in contact with the horn plates by means of a compression spring 18 acting between the sleeve 9 and a shoulder 19 within a sleeve 20 mounted loosely on the axle casing 5 and adapted to enclose the spring. The end face 21 of the sleeve 20 remote from the sleeve 9 is inclined to its axis and co-operates with another sleeve 22 similarly inclined at its end 23 and also mounted loosely on the axle casing, its endwise movement being prevented by a collar 24 fixed to the casing. The sleeve 22 is provided with a radial arm 25 or other means for rotating it, and the connection to the arm is brought in any convenient manner to the driver's seat. It will be evident, therefore, that when rotated there will be a cam action on the sleeve 20 causing it to move endwise and to vary accordingly the loading of the spring 18.

The sleeve 20 is also provided with a radial arm 26, and this is connected, preferably by a cable 27 engaging a guide pulley 28 or the like on an adjacent stationary part such as one of the cross members 29 of the chassis to, a point near the driver's seat. Packing washers such as 30 may be provided where necessary around the moving parts to exclude wet and mud, particularly at the end of the sleeve 9 to protect the splines. On this sleeve can be located the seating 31 for a leaf spring or hydraulic or other type of suspension member. Obviously the cable could be secured directly to the periphery of the sleeve if this affords sufficient leverage.

In operation, as the foregoing parts are on the inner side of the frame member, tilting of the axle and its casing 5 permits the sleeve 9 to slide outwardly so that the spring 18 extends and its pressure on the friction surfaces at 7 and 11 is reduced, which is not desirable, but, owing to the manner in which the sleeve 20 is connected by the cable 27 to the part 29, it is simultaneously twisted on the axle, and the cam action at its end 21 causes the spring loading to increase at a greater rate than the previously mentioned decrease. As a result, frictional pressure between the surfaces 7 and 11 will increase with the displacement of the axle. If the axle rises bodily the sleeve 20 will be twisted with a like result on the loading.

Owing to the V-section of the ridges 7 on the horn plates, acceleration or breaking of the vehicle tends to augment the pressure on one side of the ridge and to reduce it on the other owing to the torque reaction tending to twist the sliding plate. As the axle also tends to move horizontally, pressures due to the wedge action of the ridge tend partly to counteract and partly to increase those produced by the torque reaction. The resultant value depends on the apex agle of the ridges, and this is chosen accordingly. As in some cases it is desirable not to permit the combination of the twisting and horizontal forces to vary the loading of the coil spring 18, they can be rendered independent of one another by making the ridges of rectangular section. Thus, there will obviously be no axial pressure exerted by these forces nör increase in the loading of the spring. To facilitate removal of the back axle, the lower end of the slot 3 is bridged by the plate 6, and to avoid weakening the frame member 2 its height above the slot is increased.

The invention can be applied to a vehicle having independent wheel suspension. Figures 3 and 4 show rear driving wheels independently sprung and driven through a universal coupling at 32. Instead of V-ridges the horn plate 6 has arranged vertically on each side of the axle a channel such as 33 containing a resilient material 34, and closed by a strip of metal 35. A plate 36, carrying a hollow hub 37 and anchor plate 38 for a wheel and brake respectively is arranged on the outside face of the member 2 and has an inward hollow extension 39 splined on its exterior surface and adapted to engage internal splines on a sleeve 40 (corresponding to the sleeve 9 in Figure 1). Attached to the end of this sleeve 40 nearest the frame is a friction plate 41, corresponding to the plate 11 in Figure 1, having at its outer end flanges 42 adapted to bear on the metal strip 35 thereby to resist torque and horizontal forces due to acceleration and braking of the vehicle.

Vertical or tilting movements of the axle are damped by the employment of friction material 13 interposed between the adjacent surfaces of the plates 6 and 41 under the action of the spring 18 in conjunction with the cam action of sleeves 43 and 44, corresponding to sleeves 20 and 22 respectively of Figure 1.

The spring loading by the arm 26 and cable 27 is as shown in Figure 1. The arm 25 is omitted from the sleeve 44 but the latter is angularly adjustable about the extension 39 of the hub 37 by the means indicated at 45.

The general behaviour of these parts is as described in relation to Figures 1 and 2.

It will be understood that by suitable modification the invention is applicable to the front axle. It provides a very simple form of combined shock absorber and torque resisting device, which is self-adjusting although additional control means above described enable the driver to adjust for various road conditions without moving from his seat.

In some cases the splines between the rear axle casing and yoke sleeve can be omitted leaving merely a sliding fit. Thus in a design providing a differential casing bolted to the frame and incorporating brakes on the driving shafts, the axle casings would neither transmit driving nor braking torque, and the attaching of the axle sleeve to the friction plate can thus be simplified.

Although a seating for a suspension spring is shown only on the upper side of the sleeve 9, Figure 1, as at 31, alternatively it could be on the underside, or it could be on the upper or underside of the plates 11 or 41.

In Figure 3 a plate for the suspension is shown at 46, and is attached at the under portion of the plate 41, but alternatively could be on the upper side.

What I claim as my invention and desire to secure by Letters Patent of the United States is:—

1. In a vehicle suspension, the combination of a frame member, vertical guides thereon, a wheel axle mounted to slide in said guides, a splined sleeve slidably mounted on the wheel axle carrying radial extensions on opposite sides forming a yoke, and a guide plate attached to said yoke and adapted to frictionally engage the guides mounted on the frame, means to vary the frictional resistance between the guide plate and guides.

2. The device of claim 1 in which the means to vary the frictional resistance comprise a sleeve engaging a spring, a second sleeve secured against longitudinal movement on the axle, said sleeves engaging one another through cam faces and are angularly and independently movable about the axle.

3. The device of claim 1 with the addition that the guide plate is attached to the yoke through resiliently yielding connections.

In testimony whereof I have signed my name to this specification.

EDWARD AXELSON HELLSTRAND.